United States Patent [19]

Miyoshi et al.

[11] Patent Number: 5,013,606

[45] Date of Patent: May 7, 1991

[54] FILM FOR A RESISTANCE LAYER FOR AN ELECTRIC-THERMAL PRINT SYSTEM

[75] Inventors: Motoyuki Miyoshi; Kazuhisa Kojima; Katsuhiko Sugiura; Naomi Iketani, all of Tokyo, Japan

[73] Assignee: Mitsubishi Kasei Corporation, Tokyo, Japan

[21] Appl. No.: 399,005

[22] Filed: Aug. 28, 1989

[30] Foreign Application Priority Data

| | | | |
|---|---|---|---|
| Aug. 31, 1988 | [JP] | Japan | 63-216759 |
| May 16, 1989 | [JP] | Japan | 1-122623 |

[51] Int. Cl.[5] B41M 5/40; C08K 3/04

[52] U.S. Cl. 428/412; 428/195; 428/913; 428/914; 400/241.1; 252/511; 524/505; 524/508

[58] Field of Search 524/505, 504, 508, 537; 252/511; 428/412, 195, 913, 914; 400/241.1

[56] References Cited

U.S. PATENT DOCUMENTS

| | | | |
|---|---|---|---|
| 3,419,634 | 12/1968 | Vaughn | 524/537 |
| 4,291,994 | 9/1981 | Smith | 428/412 |
| 4,537,930 | 8/1985 | Bussink et al. | 524/505 |
| 4,564,655 | 1/1986 | Liu | 525/146 |
| 4,876,033 | 10/1989 | Dziurla | 524/496 |

FOREIGN PATENT DOCUMENTS

| | | | |
|---|---|---|---|
| 36936 | 10/1981 | European Pat. Off. . | |
| 136652 | 8/1983 | Japan | 252/511 |
| 076553 | 5/1985 | Japan | 524/504 |
| 086158 | 5/1985 | Japan . | |
| 185743 | 8/1987 | Japan . | |

OTHER PUBLICATIONS

Patent Abstracts of Japan, vol. 11, No. 54 (M-563) (2501) Feb. 19, 1987, & JP-A-61 217288 (Ricoh Company Limited) Sep. 26, 1986.

Patent Abstracts of Japan, vol. 8, No. 94 (M-293) (1581) Apr. 28, 1984, & JP-A-59 9095 (Ricoh Company Limited ) Jan. 18, 1984.

IBM Technical Disclosure Bulletin, vol. 27, No. 1a, Jun. 1984, New York US, p. 346, M. D. Shattuck et al.: "Electrothermal Printing Ribbon".

IBM Technical Disclosure Bulletin, vol. 25, No. 11b, Apr. 1983, New York US, pp. 6225–6226; W. D. Bailey et al.: "Plasticized Resist Film".

*Primary Examiner*—John C. Bleutge

*Assistant Examiner*—David Buttner

*Attorney, Agent, or Firm*—Oblon. Spivak, McClelland, Maier & Neustadt

[57] ABSTRACT

A film for a resistance layer for an electric-thermal print system, which comprises from 50 to 85% by weight of a polycarbonate resin and from 15 to 50% by weight of carbon black, and which further contains from 0.1 to 30 parts by weight, relative to 100 parts by weight of the polycarbonate resin, of an elastomer.

6 Claims, No Drawings

FILM FOR A RESISTANCE LAYER FOR AN ELECTRIC-THERMAL PRINT SYSTEM

The present invention relates to a film for a resistance layer for an electric-thermal print system. More particularly, it relates to such a film useful for print recording by noise-less typewriters, by outputs of computers or by facsimile machines.

In a melt transfer recording system wherein a meltable ink ribbon is used, or a heat sensitive color development recording system wherein a heat sensitive sheet is used, which is presently widely employed, there is a limit in the printing speed because of the heat storing effect of the thermal head, whereby it is impossible to improve the printing speed. Further, dots within the head are large, whereby it is difficult to obtain fine printing.

In the electric heat sensitive recording system, the heat storing effect by the head is small as compared with the conventional melt transfer recording system by means of a usual thermal head, whereby high speed printing is possible. Further, one electrode area is as small as ¼ of the area of the conventional thermal head, whereby fine printing is possible.

As a film for a resistance layer for the electric heat sensitive recording system, a film has been used which is prepared by mechanically dispersing carbon black in a conventional polycarbonate resin, followed by casting or extruding to form a film. In order to print at a high speed, it is necessary to increase the electrical conductivity of the film. For this purpose, carbon black is preferably at a high concentration. U.S. Pat. No. 4,103,066 discloses a ribbon which comprises a transfer coating and a substrate which is a polycarbonate resin containing from about 15% to about 40% by weight of electrically conductive carbon black. However, if carbon black is incorporated to a polycarbonate resin at a high concentration, the mechanical properties of the film tend to deteriorate, particularly the film shows no yield point, and the elongation at breakage is small. Accordingly, during the post treatment such as slitting, vapor deposition or ink coating, or when used as an electric heat sensitive recording ribbon, it is likely to break.

Under these circumstances, the present inventors have conducted extensive researches to solve such problems. As a result, it has been found that a film for a resistance layer for an electric heat sensitive recording system made of a system having an elastomer added to a polycarbonate resin and carbon black, has a yield point and an improved elongation at breakage, and it is hardly breakable during the post treatment or during its use as a ribbon. The present invention has been accomplished on the basis of this discovery.

The present invention provides a film for a resistance layer for an electric-thermal print system, which comprises from 50 to 85% by weight of a polycarbonate resin and from 15 to 50% by weight of carbon black, and which further contains from 0.1 to 30 parts by weight, relative to 100 parts by weight of the polycarbonate resin, of an elastomer.

By employing the film for a resistant layer of the present invention, even when carbon black is incorporated in a polycarbonate resin at a high concentration, the film is hardly breakable during the post treatment or during the printing, whereby high speed electric heat sensitive transfer recording will be possible.

Now, the present invention will be described in detail with reference to the preferred embodiments.

In the present invention, the polycarbonate resin is the one produced by reacting at least one bisphenol compound with phosgene or with a carbonic acid ester such as diphenyl carbonate. The bisphenol compound includes, for example, bis-(4-hydroxyphenyl)methane, 1,1-bis-(4-hydroxyphenyl)methane, 1,1-bis-(4-hydroxylphenyl)propane, 2,2-bis-(4-hydroxyphenyl)propane, i.e. bisphenol A, 2,2-bis-(4-hydroxyphenyl)butane, 2,2-bis-(4-hydroxyphenyl)pentane, 2,2-bis-(4-hydroxyphenyl)-3-methylbutane, 2,2-bis-(4-hydroxyphenyl)hexane, 2,2-bis-(4-hydroxyphenyl)-4-methylpentane, 1,1-bis-(4-hydroxyphenyl)cyclopentane, 1,1-bis-(4-hydroxyphenyl)cyclohexane, bis-(4-hydroxy-3-methylphenyl)methane, 1,1-bis-(4-hydroxy-3-methylphenyl)ethane, 2,2-bis-(4-hydroxy-3-methylphenyl)propane, 2,2-bis-(4-hydroxy-3-methylphenyl)propane, 2,2-bis-(4-hydroxy-3-isopropylphenyl)propane, 2,2-bis-(4-hydroxy-3-sec-butylphenyl)propane, bis-(4-hydroxyphenyl)phenylmethane, 1,1-bis-(4-hydroxyphenyl)-1-phenylethane, 1,1-bis-(4-hydroxyphenyl)-1-phenylpropane, bis-(4-hydroxyphenyl)phenylethane, bis-(4-hydroxyphenyl)dibenzylmethane, 4,4'-dihydroxydiphenylether, 4,4'-dihydroxydiphenylsulfone, 4,4'-dihydroxydiphenylsulfide and phenolphthalein.

With respect to the molecular weight of the polycarbonate resin, it is usual to employ the one having a viscosity average molecular weight (Mv) of from 20,000 to 200,000, preferably from 25,000 to 80,000. Particularly preferred from the practical viewpoint is the one having a viscosity average molecular weight of from 20,000 to 55,000.

The viscosity average molecular weight (Mv) is measured by a viscosity method wherein a reduced viscosity is measured in a methylene chloride solution having a concentration of 0.6 g/dl at 20° C., and $\eta_{sp/c}=0.05-0.13$ is used.

In the present invention, such a polycarbonate resin is used usually in an amount of from 50 to 85% by weight, preferably from 55 to 80% by weight, based on the total amount of the polycarbonate resin and the carbon black.

On the other hand, the carbon black may be any one of usual carbon blacks including conductive carbon blacks. They may be used alone or in combination as a mixture of two or more different types. Particularly preferred is a carbon black having a pore volume of at most 2.5 cc/g as measured by a mercury porosimeter method, a maximum peak position of the pore distribution of at least 200 Å as measured by a mercury porosimeter method and a DBP absorption of from 20 to 250 ml/100 g. Such a carbon black is incorporated in an amount of from 15 to 50% by weight, preferably from 20 to 45% by weight. If the amount of the carbon black is less than 15% by weight, no adequate electrical conductivity is obtainable, and if the amount of the carbon black exceeds 50% by weight, it becomes difficult to form a film.

As the elastomer to be used in the present invention, any one of elastomers may be employed including, for example, polystyrene type, polyolefin type, polyurethane type, polyester type, polyamide type, 1,2-polybutadiene type, polyvinyl chloride type, ethylene-vinyl acetate type, natural rubber type, fluorine rubber type, polyisopropylene type and acrylate type elastomers. Among then, polyethylene type, polyolefin type and acrylate type elastomers are preferred. Particularly preferred is a polystyrene-polyolefin block copolymer type elastomer.

Among such elastomers, particularly preferred is an elastomer having a modulus of elasticity of from 1 to 100 MPa (JIS K6301). The elastomer is added in an amount of from 0.1 to 30 parts by weight, preferably from 0.1 to 25 parts by weight, more preferably from 1 to 18 parts by weight, relative to 100 parts by weight of the polycarbonate resin. If the amount is less than 0.1 part by weight, no adequate effect for improvement of the elongation at breakage will be obtained, and if it exceeds 30 parts by weight, the volume resistivity tends to be high, whereby high speed printing tends to be difficult. Further, among these elastomers, acrylate type and styrene type elastomers tend to bring about a high volume resistivity if added in an amount of more than 25 parts by weight.

The film for a resistance layer for an electric heat sensitive recording system according to the present invention consists essentially of the above-mentioned polycarbonate resin, carbon black and elastomer. However, unless the essential feature of the present invention by the combination of these three components is not impaired, various additives such as other polymers, stabilizers such as heat stabilizers and lubricants may be incorporated in a small amount depending upon the various purposes or various cases. The film for a resistance layer of the present invention is prepared by uniformly mixing the above carbon black and the polycarbonate resin and then forming the mixture into a film having a thickness of at most 30 μm, preferably at most 20 μm, preferably by a solution casting method.

The solution casting method is conducted in such a manner that the carbon black and the elastomer are added to an organic solvent having the resin dissolved therein, then the mixture is thoroughly mixed by e.g. a ball mill or a sand grind mill to obtain a viscous solution having the carbon black dispersed therein, the viscous solution is coated on a supporting member such as a polyester film, an oriented polypropylene film or a glass plate by means of a reverse coater, a gravure coater, a die coater or a doctor blade, then the solvent is evaporated for drying, and finally a film for a resistance layer is peeled off from the supporting member.

The film for a resistant layer according to the present invention may be employed in any one of the following methods, (A) to (D).

A method wherein a three layered ribbon (A) composed of ink layer/conductive layer/resistance layer, is employed as a thermal transfer recording system, and a circuit is formed by an input electrode for printing on the resistance layer side and an earth electrode on the conductive layer side, and the ink layer is transferred to paper for recording by utilizing the resistance heat generation of the resistance layer by conducting electricity.

A method wherein a double layered ribbon (B) composed of ink layer/resistance layer, is employed, and a current is applied between at least two electrodes for printing provided at the resistance layer side, and the ink layer is transferred to paper by utilizing the resistance heat generation of the resistance layer.

A method wherein a double layered ribbon (C) composed of conductive layer/resistance layer, is employed as a heat sensitive color developing recording system using a heat sensitive sheet, a circuit is formed by providing an input electrode for printing on the resistance layer side and an earth electrode on the conductive layer side, and the heat sensitive sheet is color-developed by using the resistance heat generation of the resistance layer upon conducting electricity.

A method wherein a ribbon (D) composed solely of a resistance layer is employed, and a heat resistant sheet is color-developed by utilizing the resistance heat generation upon application of electricity between at least two electrodes for printing.

Each of the above methods has a feature that resistance heat generation is utilized.

The film for a resistance layer of the present invention may be used alone as it is or in combination with a conductive layer and/or an ink layer to form a laminate for electrical heat sensitive transfer.

For example, when a three-layered electric heat sensitive transfer recording material comprising a resistance layer, a conductive layer and an ink layer, is to be prepared, a thin film of highly conductive material such as aluminum is formed by a method such as vapor deposition in a thickness of from about 500 to about 1,000 Å as a conductive layer on the film for a resistant layer obtained in the above described method. Then, an ink layer having a thickness of from about 3 to 5 μm is coated on the conductive layer by a hot melt method or a solution method. The ink layer may be the one commonly employed in the conventional electric heat sensitive transfer recording material, and there is no particular restriction as to the ink layer. It may be composed of, for example, about 60% by weight of wax such as paraffin wax, carnauba wax or modified wax, about 20% by weight of a coloring pigment or dyestuff and about 20% by weight of a resin.

With respect to the thickness of the respective layers, the ink layer, the conductive layer and the resistance layer are preferably from 1 to 10 μm, from 0.01 to 0.2 μm, and at most 30 μm, respectively, more preferably from 2 to 5 μm, from 0.05 to 0.1 μm and at most 20 μm, respectively.

Now, the present invention will be described in further detail with reference to Examples. However, it should be understood that the present invention is by no means restricted to such specific Examples.

In the Examples, the mechanical properties such as yield point strength (YS), ultimate strength (US) and ultimate elongation (UE) of the film for a resistant layer for an electric-thermal print system of the present invention, were measured in accordance with ASTM-D882 by using Model 2005 manufactured by Kabushiki Kaisha Intesco. The electrical conductivity was measured by using Laresta AP MCP-T400, manufactured by Mitsubishi Petrochemical Co., Ltd. with respect to a volume resistivity of sample area of 25 $cm^2$ by a four probe method. The glass transition temperature (Tg) was measured by an automatic viscoelasticity meter RHEOVIBRON DDV-II-EA model at a measuring frequency of 110 Hz. The printing was visually evaluated after the ribbon obtained was printed on an ordinary sheet of paper at an applied voltage of 12 V, a pulse frequency of 100 Hz, a pulse width of 2 msec at a head running speed of 16 mm/sec.

EXAMPLE 1

72.5% by weight (12.80 g) of a polycarbonate resin (Novalex 7030A, manufactured by Mitsubishi Kasei Corporation, Mv = 30,000, granular), 27.5% by weight (4.85 g) of conductive carbon black (conductive carbon black #3250B, manufactured by Mitsubishi Kasei Corporation) and acryl elastomer (KM-330, manufactured by Rohm & Haas) in an amount of 5 parts by weight (0.64 g) per 100 parts of the polycarbonate resin, 100 g of dichloromethane as a solvent and 50 ml of chromium-coated iron beads having a diameter of 2.38 mm (manufactured by Kabushiki Kaisha Ashizawa) were charged into a 200 ml glass bottle, and after closing the bottle with a stopper, the bottle was shaked for 3 hours by an experimental dispersing machine manufactured by Toyo Seiki Kabushiki Kaisha to dissolve the polycarbonate resin and to disperse the conductive carbon black.

Three hours later, the shaking was stopped, and the glass bottle was left to cool to room temperature. Then, the viscous resin solution having the conductive carbon black dispersed therein was coated on a PET film having a thickness of 75 μm in a dry nitrogen atmosphere by a doctor knife having a clearance of 150 μm.

The coated product was immediately dried in a hot air circulating oven at 100° C. for 5 minutes to sufficiently evaporate the solvent, the film for a resistance layer thus formed, was peeled off from the PET film. The mechanical strength and the volume resistivity of the film were measured.

As the results, YS = 730 kg/cm$^2$, US = 720 kg/cm$^2$, UE = 9.2%, and the volume resistivity = 1.19 Ω·cm. From the printing evaluation, good printing was obtained without tearing or breakage.

KM-330 was changed to 0 (no addition) and 30 parts by weight relative to 100 parts by weight of the polycarbonate resin.

The results of the measurement of the physical properties of the films thus obtained are shown in Table 1. The film obtained by adding 0 part by weight (no addition) of KM-330, had a small elongation at breakage and no yield point strength. On the other hand, when the amount of KM-330 was changed to 30 parts by weight, the volume resistivity was high and the printing at a high speed was impossible, although the product showed yield strength and an improvement in the elongation at breakage. Further, formation of wrinkles due probably to heat shrinkage was observed on the film after printing.

EXAMPLE 4

The film forming operation was conducted in the same manner as in Example 1 except that Toughplane A (manufactured by Asahi Kasei Co., Ltd.) was used as a styrene-type elastomer instead of KM-330. The mechanical strength and the volume resistivity of the film thereby obtained were measured.

As a result, YS = 700 kg/cm$^2$, US = 680 kg/cm$^2$, UE = 8.0%, and the volume resistivity = 1.10 Ω·cm. In the printing evaluation, excellent printing was obtained without tearing or breakage.

TABLE 1

| | Amount of KM-330 (parts by weight) | YS (kg/cm$^2$) | US (kg/cm$^2$) | UE (%) | Volume resistivity (Ω · cm) | Glass transition temp. (°C.) |
|---|---|---|---|---|---|---|
| Example 1 | 5 | 730 | 720 | 9.2 | 1.19 | 173 |
| Example 2 | 10 | 740 | 690 | 7.5 | 1.73 | 173 |
| Example 3 | 15 | 690 | 680 | 10.0 | 2.05 | 171 |
| Comparative Example 2 | 5 | 750 | 740 | 20.3 | 17.3 | 174 |
| Comparative Example 3 | Nil | No YS | 650 | 5.5 | 0.70 | 175 |
| Comparative Example 4 | 30 | 640 | 620 | 14.8 | 10.6 | 171 |

COMPARATIVE EXAMPLES 1 and 2

The film-forming operation was conducted in the same manner as in Example 1 except that the carbon black concentration was changed to 55% by weight and 10% by weight.

At the carbon black concentration of 55% by weight, the product after drying was brittle and it was impossible to obtain a film product. On the other hand, at the carbon black concentration of 10% by weight, the volume resistivity was high, and the printing at the tested speed was impossible, although the effects for the improvement of the yield point and the elongation at breakage, were observed.

EXAMPLES 2 and 3

The film forming operation was conducted in the same manner as in Example 1 except that the amount of KM-330 was changed to 10 parts by weight and 15 parts by weight relative to 100 parts by weight of the polycarbonate resin. The results of the measurement of the physical properties of the films thus obtained are shown in Table 1. In the printing evaluation, excellent printing was obtained without tearing or breakage.

COMPARATIVE EXAMPLES 3 and 4

The film forming operation was conducted in the same manner as in Example 1 except that the amount of The film for a resistance layer of the present invention may be employed in any method.

EXAMPLE 5

70.0% by weight (12.40 g) of a polycarbonate resin (Novalex 7030A manufactured by Mitsubishi Kasei Corporation, Mv = 30,000, granular), 30.0% by weight (5.31 g) of a conductive carbon black (carbon black XC-72, manufactured by Cabot Co.), a polystyrene-polyolefin block copolymer type elastomer (KRATON G1650, manufactured by Shell Co.) in an amount of 5 parts by weight (0.62 g) per 100 parts by weight of the polycarbonate resin, 100 g of dichloromethane as a solvent and chromium-coated iron beads were charged into a glass bottle and closed with a stopper. Then, the mixture was sufficiently shaked by an experimental dispersing machine manufactured by Toyo Seiki Kabushiki Kaisha to dissolve the polycarbonate resin and to disperse the conductive carbon black.

After stopping the shaking, the glass bottle was left to cool to room temperature. Then, the viscous resin solution having the conductive carbon black dispersed therein, was coated on a PET film by a doctor blade.

The coated product wa immediately dried in a hot air circulating oven to thoroughly evaporate the solvent. The film for a resistance layer thus obtained was peeled off from the PET film. The mechanical strength and the volume resistivity of the film thus obtained were measured.

The results of evaluation thereby obtained are shown in Table 2. YS = 621 kg/cm$^2$, US = 600 kg/cm$^2$, UE = 9.0%, and the volume resistivity = 0.599 Ω·cm. In the printing evaluation, excellent printing was obtained without tearing or breakage.

COMPARATIVE EXAMPLES 5 and 6

The film forming operation was conducted in the same manner as in Example 5, except that the carbon black concentration was changed to 55% by weight and 10% by weight.

At the carbon black concentration of 55% by weight, the product after drying was brittle, and it was impossible to obtain a film product. On the other hand, at the carbon black concentration of 10% by weight, the volume resistivity was high and printing at the speed of this experiment was impossible, although effects for the improvement of the yield point and the elongation at breakage, were observed.

EXAMPLES 6 and 7

The film forming operation was conducted in the same manner as in Example 5 except that the amount of KRATON G1650 was changed to 11 parts by weight and 18 parts by weight relative to 100 parts by weight of the polycarbonate resin.

The results of evaluation of the films thereby obtained are shown in Table 2. In the printing evaluation, excellent printing was obtained without breakage.

COMPARATIVE EXAMPLES 7 and 8

The film forming operation was conducted in the same manner as in Example 5 except that the amount of KRATON G1650 was changed to 0 part by weight (no addition) and 40 parts by weight relative to 100 parts by weight of the polycarbonate resin.

The results of evaluation of the films thereby obtained are shown in Table 2. When the amount of KRATON G1650 was 0% by weight (no addition), the elongation at breakage of the film was small, and the film showed no yield point strength. On the other hand, when the amount of KRATON G1650 was changed to 40 parts by weight, the volume resistivity was high and printing at a high speed was impossible, although it showed yield point strength and an improvement in the elongation at breakage. Further, formation of wrinkles due probably to heat shrinkage, was observed on the film after printing.

EXAMPLE 8

The film forming operation was conducted in the same manner as in Example 5 except that instead of KRATON G1650, KRATON G1652 was used. As a result of evaluation of the film thereby obtained, YS = 730 kg/cm$^2$, US = 720 kg/cm$^2$, UE = 9.2%, and volume resistivity = 0.605 Ω·cm. In the printing evaluation, excellent printing was obtained without tearing or breakage.

TABLE 2

| | Amount of elastomer (parts by weight) | YS (kg/cm$^2$) | US (kg/cm$^2$) | UE (%) | Volume resistivity (Ω · cm) | Glass transition temp. (°C.) |
|---|---|---|---|---|---|---|
| Example 5 | 5 | 621 | 600 | 9.0 | 0.599 | 172 |
| Example 6 | 11 | 529 | 513 | 10.5 | 0.690 | 172 |
| Example 7 | 18 | 462 | 460 | 14.0 | 0.840 | 170 |
| Comparative Example 6 | 5 | 750 | 740 | 20.3 | 10.3 | 174 |
| Comparative Example 7 | Nil | No YS | 650 | 5.5 | 0.70 | 175 |
| Comparative Example 8 | 40 | 640 | 620 | 14.8 | 10.6 | 171 |

We claim:

1. A ribbon for an electrical-thermal print system selected from the group consisting of (A) a three layered ribbon composed of ink layer/conductive layer/resistance layer, (B) a double layered ribbon composed of ink layer/resistance layer and (C) a double layered ribbon composed of conductive layer/resistance layer wherein said resistance layer comprises from 50 to 85% by weight of a polycarbonate resin and from 15 to 50% by weight of carbon black, and which further contains from 0.1 to 30 parts by weight, relative to 100 parts by weight of the polycarbonate resin, of an elastomer selected from the group consisting of styrene containing elastomers, polyolefin elastomers and acrylate elastomers.

2. The ribbon according to claim 1, wherein the elastomer has a modulus of elasticity of from 1 to 100 MPa.

3. The ribbon according to claim 1, wherein the content of the elastomer is from 1 to 18 parts by weight, relative to 100 parts by weight of the polycarbonate resin.

4. The ribbon according to claim 1, wherein the polycarbonate resin has a viscosity average molecular weight of from 25,000 to 80,000.

5. The ribbon according to claim 1, wherein the elastomer is a polystyrene-polyolefin block copolymer type elastomer.

6. The ribbon of claim 1 wherein the elastomer is a polyolefin elastomer.

* * * * *